(12) United States Patent
Thommana et al.

(10) Patent No.: US 12,489,515 B1
(45) Date of Patent: Dec. 2, 2025

(54) SIGNAL RELAY DEVICE FOR OPERATION IN CONTESTED ENVIRONMENT

(71) Applicant: Rockwell Collins, Inc., Cedar Rapids, IA (US)

(72) Inventors: John V. Thommana, Cedar Rapids, IA (US); Jeffrey D. Grundmeyer, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 308 days.

(21) Appl. No.: 18/223,392

(22) Filed: Jul. 18, 2023

(51) Int. Cl.
*H04B 7/00* (2006.01)
*H04B 7/155* (2006.01)
*H04B 7/26* (2006.01)

(52) U.S. Cl.
CPC ........... *H04B 7/15514* (2013.01); *H04B 7/26* (2013.01)

(58) Field of Classification Search
CPC .............................. H04B 7/15514; H04B 7/26
See application file for complete search history.

(56) References Cited

U.S. PATENT DOCUMENTS

| | | | |
|---|---|---|---|
| 8,774,014 B2 * | 7/2014 | Seo | H04B 7/2606 370/246 |
| 9,281,889 B2 | 3/2016 | Kim et al. | |
| 9,402,215 B1 | 7/2016 | Park et al. | |
| 9,838,175 B2 | 12/2017 | Kim et al. | |
| 10,158,416 B1 | 12/2018 | Cooper et al. | |
| 11,265,375 B2 | 3/2022 | Liberti | |
| 11,626,912 B2 * | 4/2023 | Zhou | H04B 7/026 375/262 |
| 2011/0310747 A1 * | 12/2011 | Seo | H04W 72/541 370/278 |
| 2012/0127888 A1 * | 5/2012 | Fujishima | H04W 72/542 370/252 |
| 2016/0282462 A1 * | 9/2016 | Pitts | G01S 13/426 |
| 2021/0013960 A1 * | 1/2021 | Raghavan | H04W 88/04 |
| 2023/0091438 A1 * | 3/2023 | Thein | H04B 7/15514 455/7 |
| 2023/0156578 A1 * | 5/2023 | Kim | H04W 48/16 455/434 |
| 2023/0246756 A1 * | 8/2023 | Khoshnevisan | H04B 7/26 370/329 |

(Continued)

FOREIGN PATENT DOCUMENTS

| | | |
|---|---|---|
| AU | 2018302739 A1 | 11/2019 |
| WO | 2022041028 A1 | 3/2022 |

*Primary Examiner* — Md K Talukder
(74) *Attorney, Agent, or Firm* — Suiter Swantz IP

(57) ABSTRACT

A system is disclosed. The system includes at least one signal relay device communicatively located between a base station configured to send and receive signals on a first channel and user equipment configured to send and receive signals on a second channel, wherein the at least one signal relay device is configured to: operate in contested environments; receive a base station signal on the first channel while operating in the contested environment; transform the base station signal on the first channel to the second channel; send the base station signal to the user equipment on the second channel while operating in the contested environment; receive a user equipment signal on the second channel; transform the user equipment signal on the second channel to the first channel; and send the user equipment signal to the base station on the first channel.

19 Claims, 16 Drawing Sheets

(56) References Cited

U.S. PATENT DOCUMENTS

| | | | | |
|---|---|---|---|---|
| 2023/0247513 A1* | 8/2023 | Paladugu | .............. | H04W 88/04 |
| | | | | 370/315 |
| 2023/0276410 A1* | 8/2023 | Chen | ................ | H04W 72/1268 |
| | | | | 370/329 |
| 2023/0370864 A1* | 11/2023 | Chen | ..................... | H04W 48/16 |
| 2024/0014885 A1* | 1/2024 | Yang | ................. | H04B 7/15528 |

* cited by examiner

SIGNAL RELAY DEVICE FOR OPERATION IN CONTESTED ENVIRONMENT

BACKGROUND

In a contested environment, communication between a base station and soldiers is important. However, an enemy may introduce jammers to block communication between the base station and the soldiers. Therefore, it may be desirable to provide a solution for jammed signals.

SUMMARY

A system is disclosed, in accordance with embodiments of the present disclosure. The system includes at least one signal relay device communicatively located between a base station configured to send and receive signals on a first channel and user equipment configured to send and receive signals on a second channel, wherein the first channel and the second channel are different channels, wherein the at least one signal relay device comprises at least one multi-function aperture (MFA), wherein the at least one signal relay device is configured to: operate in a contested environment; receive a base station signal on the first channel while operating in the contested environment; transform the base station signal on the first channel to the second channel; send the base station signal to the user equipment on the second channel while operating in the contested environment; receive a user equipment signal on the second channel; transform the user equipment signal on the second channel to the first channel; and send the user equipment signal to the base station on the first channel.

A method is disclosed, in accordance with embodiments of the present disclosure. The method includes a step of operating, by at least one signal relay device, in a contested environment, wherein at least one signal relay device is located communicatively between a base station configured to send and receive signals on a first channel and user equipment configured to send and receive signals on a second channel, wherein the first channel and the second channel are different channels, wherein the at least one signal relay device comprises at least one multi-function aperture (MFA). The method includes a step of receiving, by the at least one signal relay device, a base station signal on the first channel while operating in the contested environment. The method includes a step of transforming, by the at least one signal relay device, the base station signal on the first channel to the second channel. The method includes a step of sending, by the at least one signal relay device, the base station signal to the user equipment on the second channel while operating in the contested environment. The method includes a step of receiving, by the at least one signal relay device, a user equipment signal on the second channel. The method includes a step of transforming, by the at least one signal relay device, the user equipment signal on the second channel to the first channel. The method includes a step of sending, by the at least one signal relay device, the user equipment signal to the base station on the first channel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
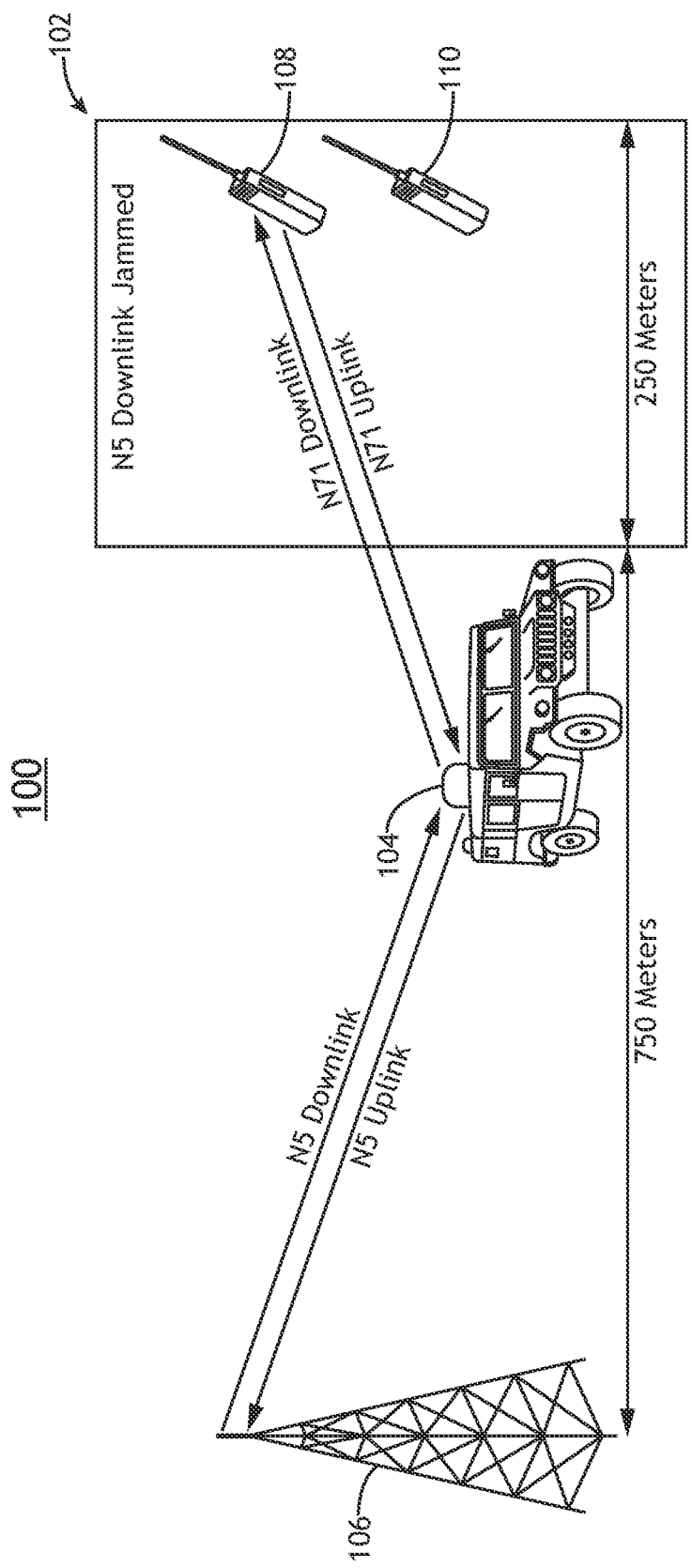
FIG. 1 is a schematic depicting a system for extending a signal into a jammed area, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Some embodiments of the present disclosure are broadly directed to a system to allow for transmission of signals in a contested (e.g., a jammed) environment. The system may include a signal relay device configured to relay signals between user equipment located in a jammed area and a base station. In this way, effects of jamming on the user equipment may be counteracted such that effective communication is possible between the user equipment and the base station, even if the user equipment is located in a jammed area.

Referring generally now to FIGS. 1-7, various embodiments of a system 100 to increase the effective range of a signal in a contested (e.g., a jammed) environment are disclosed in greater detail.

FIG. 1 is a schematic depicting a system 100 for extending a signal into a jammed area 102, in accordance with one or more embodiments of the present disclosure.

In some embodiments, the system 100 includes at least one signal relay device 104. The signal relay device 104 may be communicatively located between a base station 106 and user equipment 108. Further, the signal relay device 104 may be further communicatively located between the base station 106 and the jammed area 102 (e.g., between the base station 106 and the edge of the jammed area 102 nearest the base station 106).

For example, in an unjammed scenario, the user equipment 108 and the base station 106 may communicate with each other freely. However, when the user equipment 108 is located in a jammed area 102, communication between the base station 106 and the user equipment 108 may be blocked. In this scenario, a signal relay device 104 may be deployed at or near the edge of the jammed area 102. In this way, the signal relay device 104 may allow communication between the base station 106 and the user equipment 108, even when the user equipment 108 is located in the jammed area 102.

The base station 106 may be any site configured to send signals to user equipment 108 and receive signals from user equipment 108 (e.g., configured to communicate with user equipment 108). Further, the base station 106 may include an antenna configured to send and receive signals, located at a base of operations for various activities.

The base station 106 may operate on a predetermined set of channels. In this way, upon jamming of the user equipment 108, the base station 106 may not change the channels that the base station 106 is broadcasting signals on. Instead, the signal relay device 104 may transform the signals being sent between the base station 106 and the user equipment 108 such that the base station 106 and the user equipment 108 think they can hear each other (e.g., the base station 106 and the user equipment 108 behave as though they are not operating in a jammed area 102).

The user equipment 108 may broadly encompass any device capable of sending and receiving signals, including, but not limited to, a mobile phone. Broadly speaking, mobile phones (and thus user equipment 108) may send and receive signals (e.g., data) on a wide variety of channels. For example, a mobile phone may be enabled to send and receive signals on fifteen or more channels (e.g., channels within the spectrum allocated to 5G cellular). Further, a mobile phone may be enabled to communicate with third generation (3G) signals, fourth generation (4G) signals, fourth generation plus (4G+ or 4G-LTE) signals, fifth generation (5G) signals, and/or sixth generation (6G) signals.

Currently, commercial off-the-shelf (COTS) jammers may only jam up to seven channels. Therefore, an enemy may be required to carry three or more jammers in order to jam the user equipment 108 from communicating on all the channels supported by the mobile phone. Further, because of the variety of channels the user equipment 108 may be able to send and receive signals on, the jammers may be too large to be deployed effectively via a COTS drone that is difficult to detect and neutralize, therefore, a ground-based jammer may be required (e.g., a jammer in a ground-based vehicle).

When jamming of user equipment 108 is detected, the signal relay device 104 may be deployed to be communicatively located between the base station 106 and the user equipment 108. In some embodiments, the user equipment 108 may be configured to detect one or more jammed channels. This may allow a soldier to communicate the presence of jammed channels to a mission commander, thus allowing a mission commander to determine what areas of a contested area are jammed. With this knowledge, the mission commander may determine an optimal location to place the signal relay device 104. For example, a soldier may have a tactical radio 110 in addition to their user equipment 108. Therefore, the jamming status of the user equipment 108 may be sent to a mission commander via the tactical radio 110. The mission commander may also have a tactical radio 110. The range of the tactical radio 110 may be significantly larger than the range of the base station 106. In this way, the tactical radio 110 may be able to extend into an area where the base station 106 is jammed.

For example, the signal relay device 104 may be deployed on a vehicle. In this way, the signal relay device 104 may be mobile and may be deployed upon the mission commander receiving notice that there are one or more channels being jammed (e.g., the user equipment 108 is located in a jammed area 102). Therefore, a vehicle including the signal relay device 104 may be positioned to counteract a signal jammer upon the mission commander receiving notice that one or more channels are being jammed by the signal jammer.

When the signal relay device 104 is deployed, the signal relay device 104 may perform a scan of the radio frequency spectrum in order to determine what channels are being jammed. The signal relay device 104 may pick a channel that is not jammed after performing the scan in order to relay the signal from the base station 106 to the user equipment 108. In this way, both the base station 106 and the user equipment 108 may not know the other is operating on a different channel.

Once the signal relay device 104 is deployed, the signal relay device 104 may facilitate communication between the user equipment 108 and the base station 106. The signal relay device 104 may facilitate communication between the base station 106 and user equipment 108 by transforming and relaying a signal sent by the user equipment 108 or the base station 106 to the other of the user equipment 108 or base station 106.

It is noted that in a jammed scenario (e.g., a scenario where relaying a signal is required) the user equipment 108 and the base station 106 may be required to operate on different channels.

For example, the base station 106 may send a signal directed to the user equipment 108. However, because the user equipment 108 is located in a jammed area 102, direct communication between the base station 106 and the user equipment 108 may be impossible. Therefore, the signal relay device 104 may receive the signal from the base station 106 directed at the user equipment 108. The signal received from the base station 106 may be on a first channel (e.g., the channel the base station 106 is operating on). The signal relay device 104 may then transform the signal on the first channel to a signal on the second channel (e.g., the channel the user equipment 108 is operating on). After transforming the signal from the first channel to the second channel, the signal relay device 104 may then transmit (e.g., send) the signal on the second channel to the user equipment 108.

By way of another example, the user equipment 108 may send a signal directed to the base station 106. However, because the user equipment 108 is located in a jammed area 102, direct communication between the base station 106 and the user equipment 108 may be impossible. Therefore, the signal relay device 104 may receive the signal from the user equipment 108 directed at the base station 106. The signal received from the user equipment 108 may be on a second channel (e.g., the channel the user equipment 108 is operating on). The signal relay device 104 may then transform the signal on the second channel to a signal on the first channel ((e.g., the channel the base station 106 is operating on). After transforming the signal from the second channel to the first channel, the signal relay device 104 may then transmit (e.g., send) the signal on the first channel to the base station.

The second channel may be any channel not jammed by the jammer (e.g., a signal that may pass through the jammed area 102 and reach the user equipment 108). Put another way, the second channel may be selected to be different than any channels that are jammed. Further, it is noted that the first channel and the second channel may be selected from an area of overlapping operable channels between the base station 106 and the user equipment 108. However, it is further noted that the first channel is selected from operable channels for the base station 106, while the second channel is selected from operable channels for the user equipment 108, with no overlap in operability between the base station 106 and the user equipment 108. In any case, it may be necessary for the signal relay device 104 to be capable of sending and receiving signals on both the first channel and the second channel.

Figure 2A:
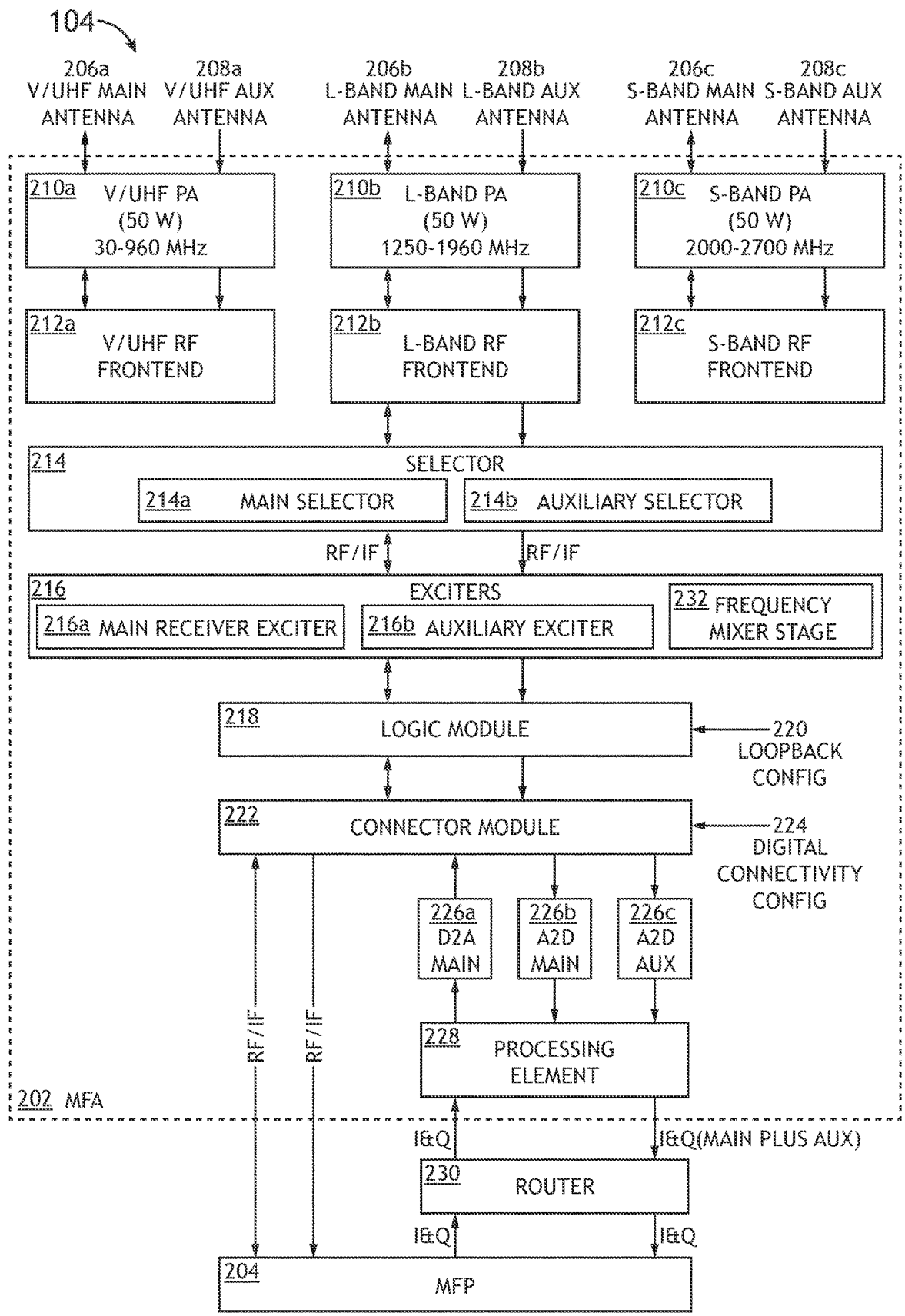
FIG. 2A is a block diagram of at least part of the signal relay device of FIG. 1, in accordance with one or more embodiments of the present disclosure.
Figure 2B:
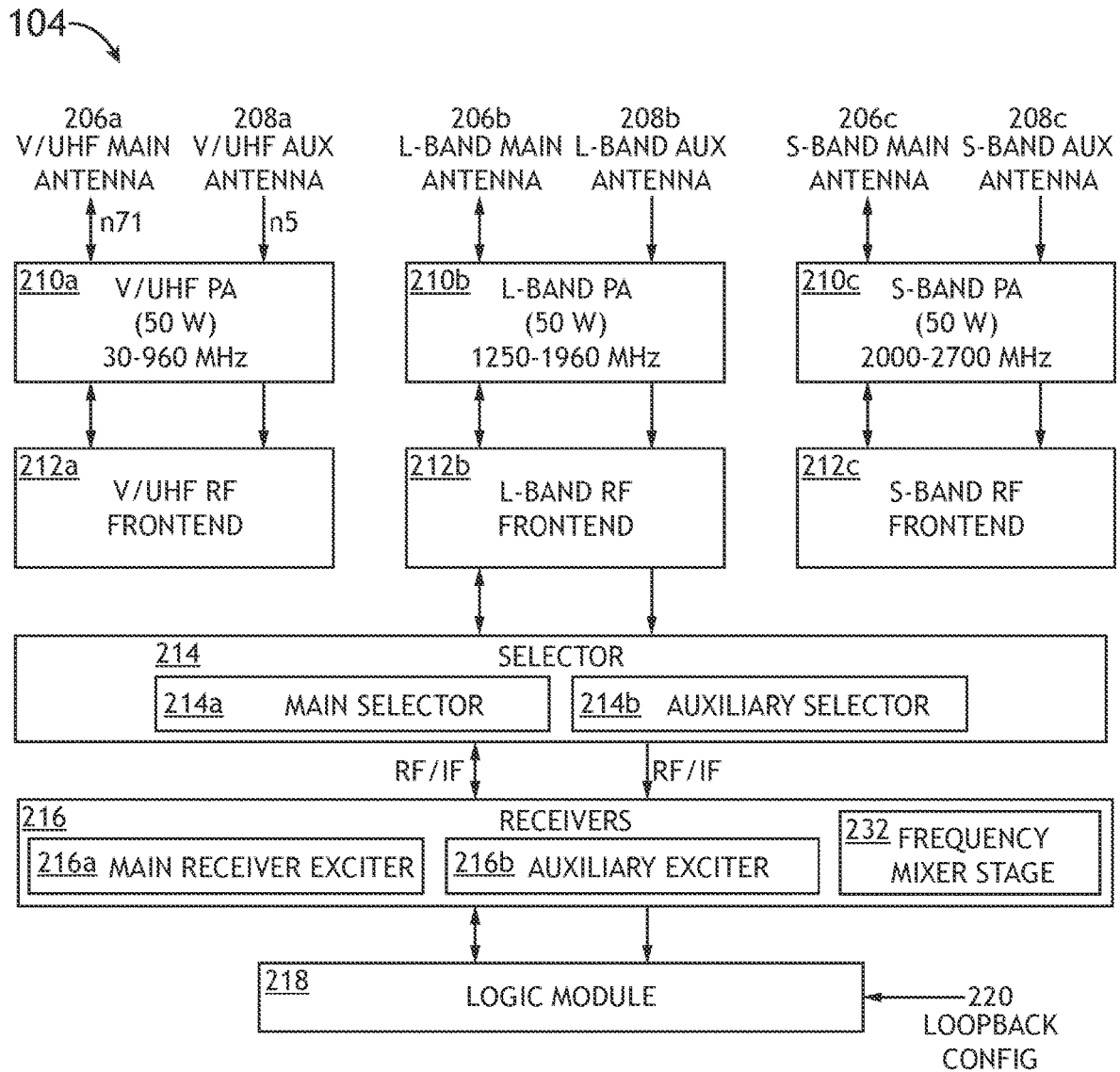
FIG. 2B is a block diagram of at least part of the signal relay device of FIG. 1, in accordance with one or more embodiments of the present disclosure.

FIGS. 2A and 2B are block diagrams illustrating at least part of a signal relay device 104, in accordance with one or more embodiments of the present disclosure. In some embodiments, a signal relay device includes at least multi-function aperture (MFA) 202 and/or at least one multi-function processor (MFP) 204. However, the MFP 204 may only be used to configure the MFA 202.

FIG. 2A illustrates an MFA 202 communicatively coupled to an MFP 204, in accordance with one or more embodiments of the present disclosure.

The signal relay device 104 may include a plurality of main antennas 206 and a plurality of auxiliary antennas 208. Further, the signal relay device 104 may be configured to send and/or receive very high frequency or ultra-high frequency (VHF/UHF) signals, L-Band signals, and/or S-Band signals. In this way, there may be a VHF/UHF main antenna 206a, a VHF/UHF auxiliary antenna 208a, an L-band main antenna 206b, an L-band auxiliary antenna 208b, an S-Band main antenna 206c, and/or an S-Band auxiliary antennas 208c. In some embodiments, the main antennas 206 may be configured to send and receive signals, while the auxiliary antennas 208 (e.g., receive-only antennas) may be configured to only receive signals.

In some embodiments, the signal relay device 104 may include two antennas. For example, the signal relay device 104 may include a main antenna with coverage from 600 megahertz (MHz) to 6 gigahertz (GHz). The signal relay device may also include an auxiliary receive antenna with a similar coverage area.

The signal relay device 104 may further include a plurality of power amplifiers (PAS) 210. For example, the signal relay device may include a VHF/UHF PA 210a, an L-Band PA 210b, and/or an S-Band PA 210c.

The signal relay device 104 may further include a plurality of frontends 212 For example, the signal relay device may include a tunable VHF/UHF frontend 212a, an L-Band frontend 212b, and/or an S-Band frontend 212c.

The signal relay device 104 may further include one or more band selectors 214 (e.g., band switcher). For example, the one or more band selectors 214 may include a main band selector 214a and an auxiliary band selector 214b. The one or more band selectors 214 may give the signal relay device 104 the ability to select any channel (e.g., VHF/UHF, L-Band, and/or S-Band).

The signal relay device 104 may further include one or more receivers 216. For example, the one or more receivers 216 may include a main receiver-exciter 216a and an auxiliary receiver 216b. The main receiver-exciter 216a may be capable of sending and receiving signals, while the auxiliary receiver 216b may only be capable of receiving signals.

The signal relay device 104 may further include a logic module 218. The logic module 218 may either allow the signal to pass through or go through a loopback process (e.g., via a loopback configuration 220).

The loopback configuration may help reduce latency issues within the signal relay device. For example, sending a signal between the MFA 202 and MFP 204 may cause significant unwanted latency issues. However, giving the MFA 202 the capability to loop back the received signal in order to transmit the signal itself may significantly reduce the latency associated with including the MFP 204 in the signal relay process.

The signal relay device 104 may further include a connector module 222. For example, the connector module may allow for either digital or analog connections between the MFA 202 and the MFP 204. The analog connection between the MFA 202 and the MFP 204 may be made directly (e.g., direct connection of radio frequency (RF) signals and intermediate frequency (IF) signals), while a digital connection between the MFA 202 and the MFP 204 may require additional components (e.g., a digital connectivity configuration 224).

In some embodiments, the signal relay device 104 may further include a plurality of converters 126. The converters 126 may be configured to convert analog signals to digital signals and/or convert digital signals to analog signals. For example, there may be a main digital to analog converter 226a, a main analog to digital converter 226b, and/or an auxiliary analog to digital converter 226c.

In some embodiments, the signal relay device 104 further include a processing element 228. The processing element 228 may be configured to execute VMEbus International Trade Association (VITA) 49.2 processing steps and/or protocols in order to facilitate the relay of a signal between the base station 106 and the user equipment 108.

In some embodiments, the signal relay device 104 may further include a router 230. The router 230 may provide a connection between the MFA 202 and the MFP 204 of the signal relay device 104.

FIG. 2B illustrates an MFA 202, in accordance with one or more embodiments of the present disclosure. In FIG. 2B, in some embodiments, the MFA 202 may be configured to operate only in an analog domain. As can be seen in FIG. 2B, elements of the signal relay device 104 configured to facilitate digital signal operations have been removed.

Referring broadly to FIGS. 2A and 2B, operation and functions of the signal relay device 104, including the MFA 202 and the MFP are be described in greater detail below.

In some embodiments, the auxiliary receiver 216b may receive a downlink RF (e.g., based on a signal sent from the base station 106 to the user equipment 108 or a signal sent from the user equipment 108 to the base station 106). The auxiliary receiver 216b may then cause the downlink signal to be transformed to an IF via at least one frequency mixer state 232. The frequency mixer stage 132 may include local oscillator injections and passband filtering. The frequency mixer stage 132 including local oscillator injections and passband filtering may create a replica (e.g., a copy) of the downlink RF at the IF.

Further, the loopback configuration 220 may direct the IF to a main receiver exciter 216a in order to transform the IF into an uplink RF (e.g., a signal sent from the signal relay device 104 to the user equipment 108 or a signal sent from the signal relay device 104 to the base station 106). Further, the transformation may further include local oscillator injections and passband filtering.

In some embodiments, the MFA 202 may be configured to receive an RF or an IF and digitize the received RF or IF. The digitized RF or IF may then be transmitted to the MFP 204, where the MFP may perform waveform receive functions on the digitized frequency (e.g., the MFA 202 digitizes at least one RF or IF signal and provides the digitized signals to the MFP 204). The MFP 204 may subsequently retransmit the RF or IF back to the MFA 202. After the MFA 202 receives the RF or IF from the MFP 204, the MFA 202 may broadcast the received signal. However, the functionality of the MFA 202 and MFP 204 in the preceding paragraph may cause latency issues within the signal relay device 104 and/or the system 100, and thus may not be implemented.

In embodiments, the MFP 204 may only be used to determine channels that are jammed. In this way, the MFP 204 may tune the auxiliary receiver 216b to different 5G channels (e.g., 5G channels covered by the functionality of the MFA 204). The MFP 204 may then determine whether or not each of the different 5G channels is in use by a different base station (e.g., not the base station 106 that the signal relay device 104 is configured to relay signals from). The MFP 204 may also determine whether or not each of the different 5G channels is jammed. This may allow unjammed 5G channels to be detected to be used to relay signals.

In some embodiments, the MFA 202 and the MFP 204 may be connected by either an analog connection, a digital connection, or a combination of analog and digital connections.

Further, in some embodiments, the MFA 202 may be configured to perform RF functions of a radio. The MFA 202 may also support a half-duplex channel and/or a receive-only channel. The half-duplex channel may be a main channel and the receive only channel may be an auxiliary channel. The receive-only channel may be configured to receive signals from all supported channels.

In some embodiments, the MFP 204 may be configured to perform at least one of waveform signal processing, cryptography, or networking functions. Further, the MFP 204 may be configured to perform all of waveform signal processing, cryptography, and networking functions.

Figure 3:
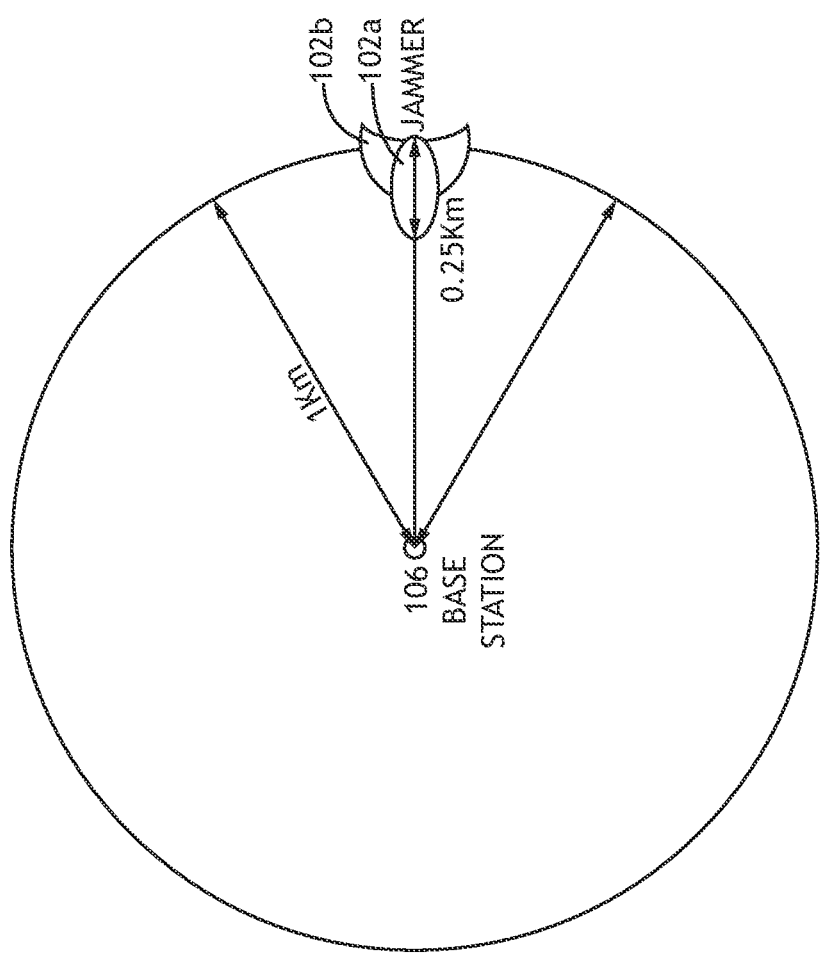
FIG. 3 is a schematic depicting a jammed area, in accordance with one or more embodiments of the present disclosure.

FIG. 3 is a schematic depicting a jammed area 102, in accordance with one or more embodiments of the present disclosure.

In FIG. 3, two jammed areas 102 are shown (e.g., a first jammed area 102a and a second jammed area 102b). For example, the first jammed area 102a and the second jammed area 102b may be produced by different jammers. In this way and by way of example, the first jammed area 102a may be caused by a jammer with a 6 decibels relative to isotropic (dBi) gain antenna and the second jammed area 102b may be caused by a jammer with a 3 dBi gain antenna.

It should be noted that jammers deployed by enemies in contested environments (e.g., tactical theaters) rarely use omnidirectional antennas. The use of omnidirectional antennas may introduce jamming into the enemy's territory, which would be undesirable. Instead, jammers with focused antennas are used to introduce jamming into the contested area. There also may be a tradeoff to make when selecting the gain of antenna. For example, increase the gain of an antenna may reduce the area of coverage of the jammed area 102 by beam narrowing and may limit the number of receivers a particular antenna can target. However, a higher gain signal may be able to push further into the contested area.

Further, FIG. 3 shows the spread of a signal sent by the base station 106, in accordance with one or more embodiments of the present disclosure. For example, many antennas send a signal out in a 60° sector, while others send signals in a 120° sector. Therefore, a base station 106 may require a minimum of either 6 antennas (in the case of a 60° arc) or three antennas (in the case of a 120° arc) to fully cover a broadcast area.

Figure 4:
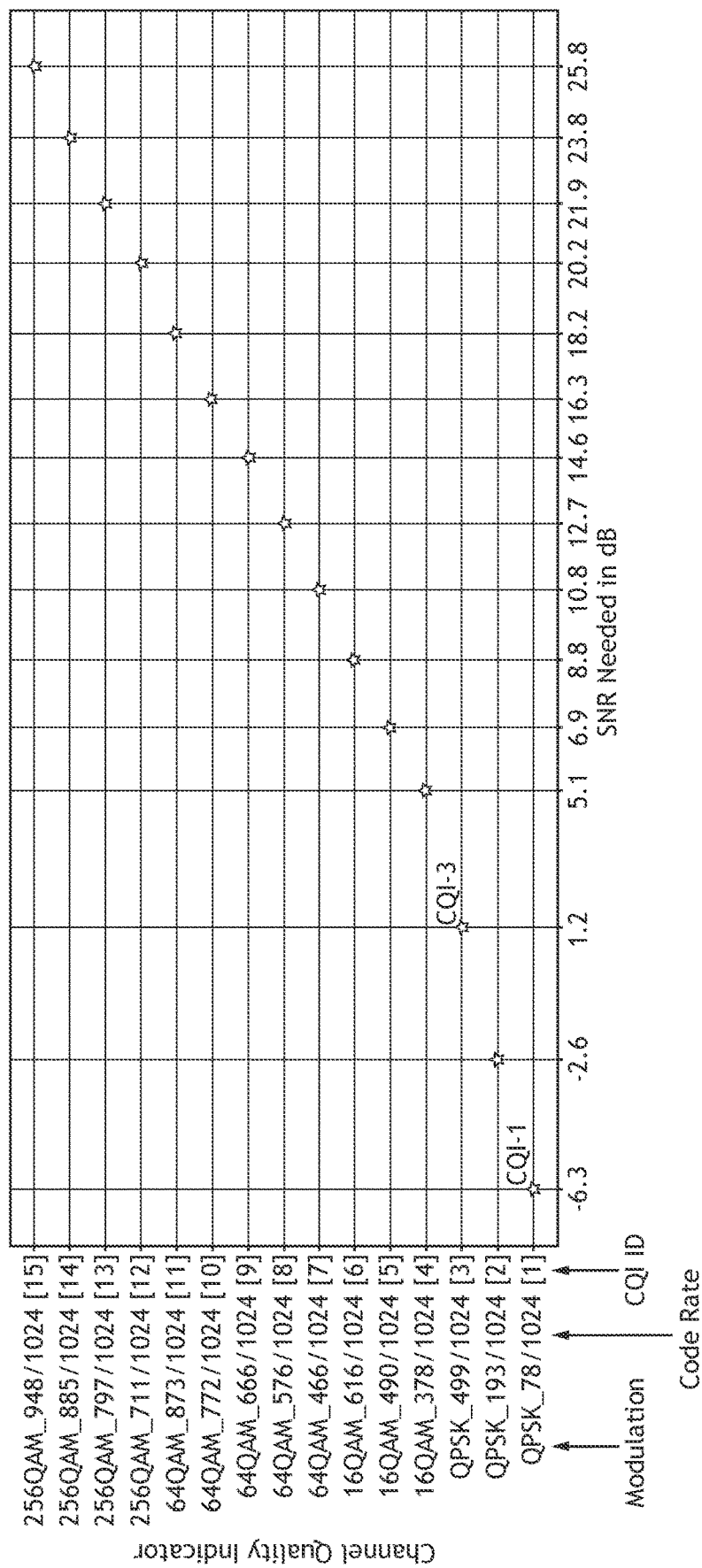
FIG. 4 is a chart depicting various channel quality indicators (CQIs), in accordance with one or more embodiments of the present disclosure.

FIG. 4 is a chart depicting various channel quality indicators (CQIs), in accordance with one or more embodiments of the present disclosure.

For example, FIG. 4 shows CQI-1 through CQI-15. It is noted that as the CQI increases, the rate at which data is transmitted is also increased. However, as the CQI increases, the required signal to noise ration (SNR) to transmit the data also increases. Therefore, there may be significant tradeoffs for selecting higher or lower CQIs.

Broadly speaking, FIGS. 5A–5I are graphs depicting various jamming scenarios. In FIGS. 5A–5I, the cell edge (e.g., how far the base station 106 would transmit under normal circumstances) is 1 kilometer (km) from the base station 106. Further, it can be seen throughout FIGS. 5A–5I that the signal from the base station 106 decreases in strength as it approaches the cell edge, while the jammer decreases in strength as it approaches the base station 106. Jamming may begin at the point where the curve representing the strength of the signal from the base station 106 intersects with the curve representing the strength of the jammer (e.g., a signal will be jammed when the signal from the base station 106 is weaker than the jammer and a signal will not be jammed when the signal from the base station 106 is stronger than the jammer). Further, the sensitivity of the user equipment 108 stays constant from the base station 106 to the cell edge.

Figure 5A:
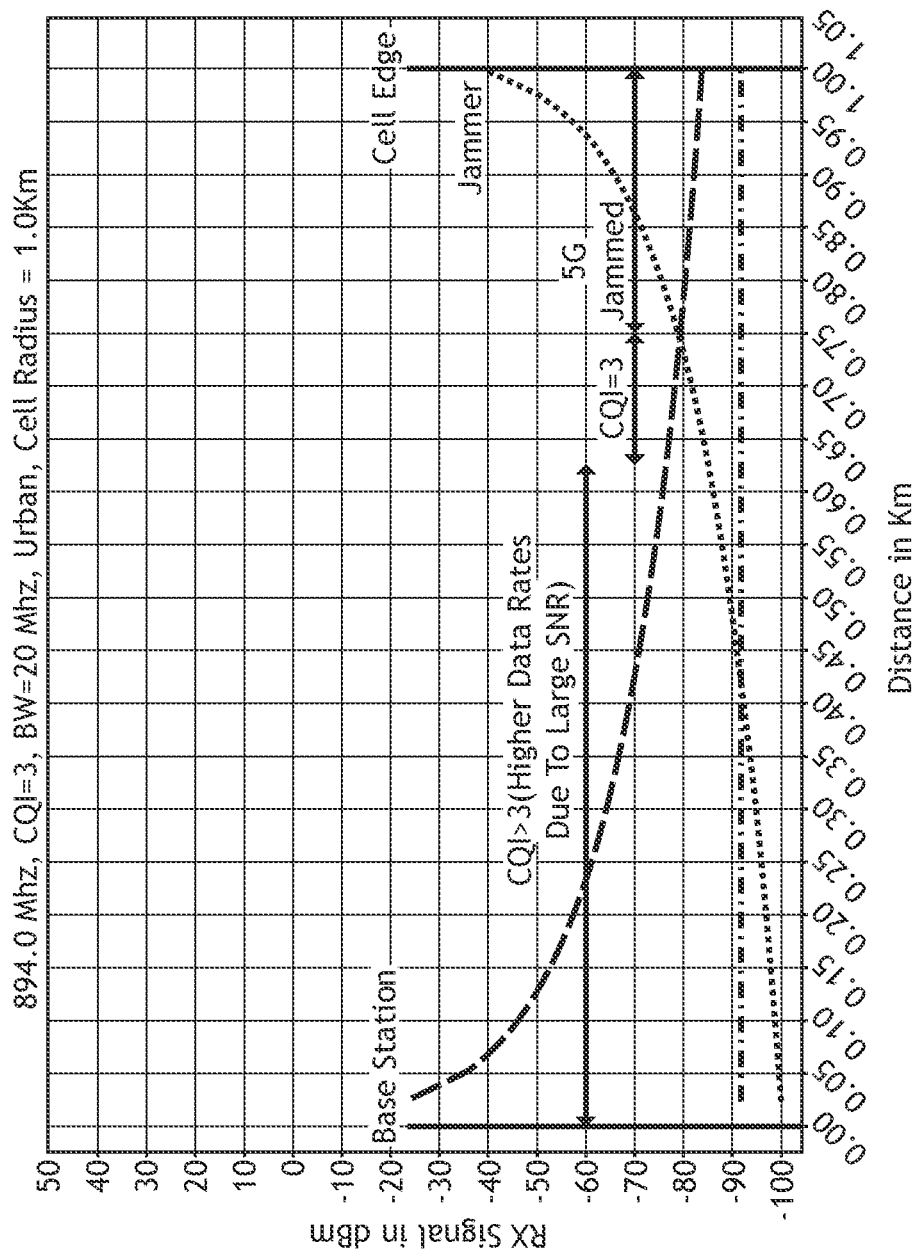
FIG. 5A is a chart showing an effect of jamming on signals with different CQIs, in accordance with one or more embodiments of the present disclosure.

FIG. 5A is a chart showing the effect of jamming on signals with different CQIs, in accordance with one or more embodiments of the present disclosure. Specifically, FIG. 5A shows the effect of jamming on signals at CQI-3, and the effect of jamming on signals at a CQI greater than three. Here, the jammer is placed at the cell edge (1 km from the base station 106) in urban terrain. Because of the heightened SNR requirements in signals at a CQI greater than three, the jammer has a heightened effect because even as the jammer reduces in strength it is still able to produce enough noise to jam the signal. However, even with a more robust SNR requirement, CQI-3 is still jammed for the 0.25 km furthest between the base station 106 and the cell edge. Therefore, in this example, an adjustment needs to be made or user equipment 108 located more than 0.75 km from the base station 106 will not be able to send and receive signals (e.g., communicate with the base station 106).

Figure 5B:
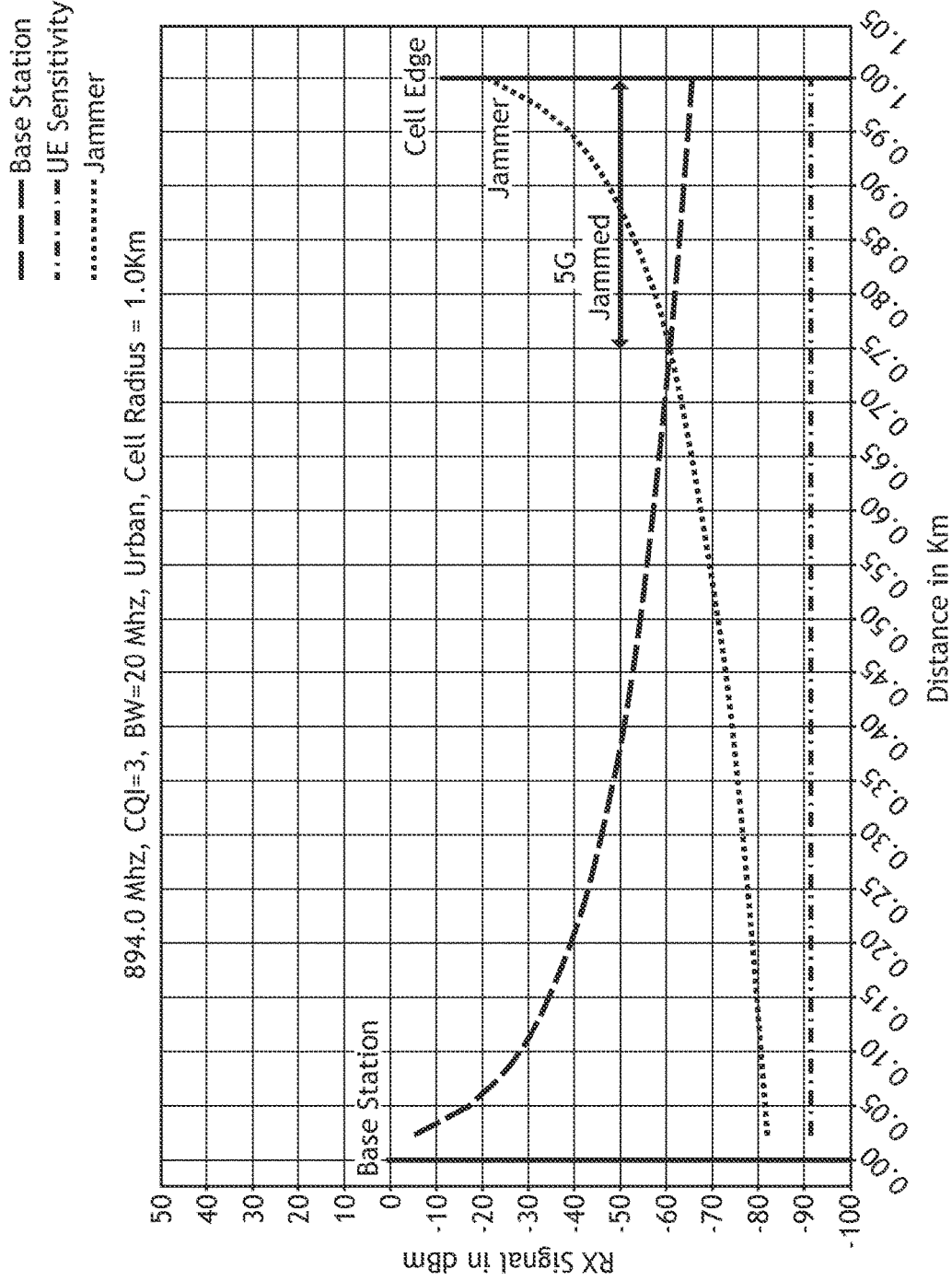
FIG. 5B is a chart showing an effect of jamming in a rural environment, in accordance with one or more embodiments of the present disclosure.

FIG. 5B is a chart showing the effect of jamming in a rural environment, in accordance with one or more embodiments of the present disclosure. Here, the jammer is placed at the cell edge (1 km from the base station 106) in rural terrain, with a signal at CQI-3. FIG. 5B shows that in a rural environment, the signal from the base station 106 will be receivable to user equipment up to 0.75 km from the base station 106, but beyond 0.75 km, the jammer will prohibit the user equipment 108 from hearing the base station 106.

Figure 5C:
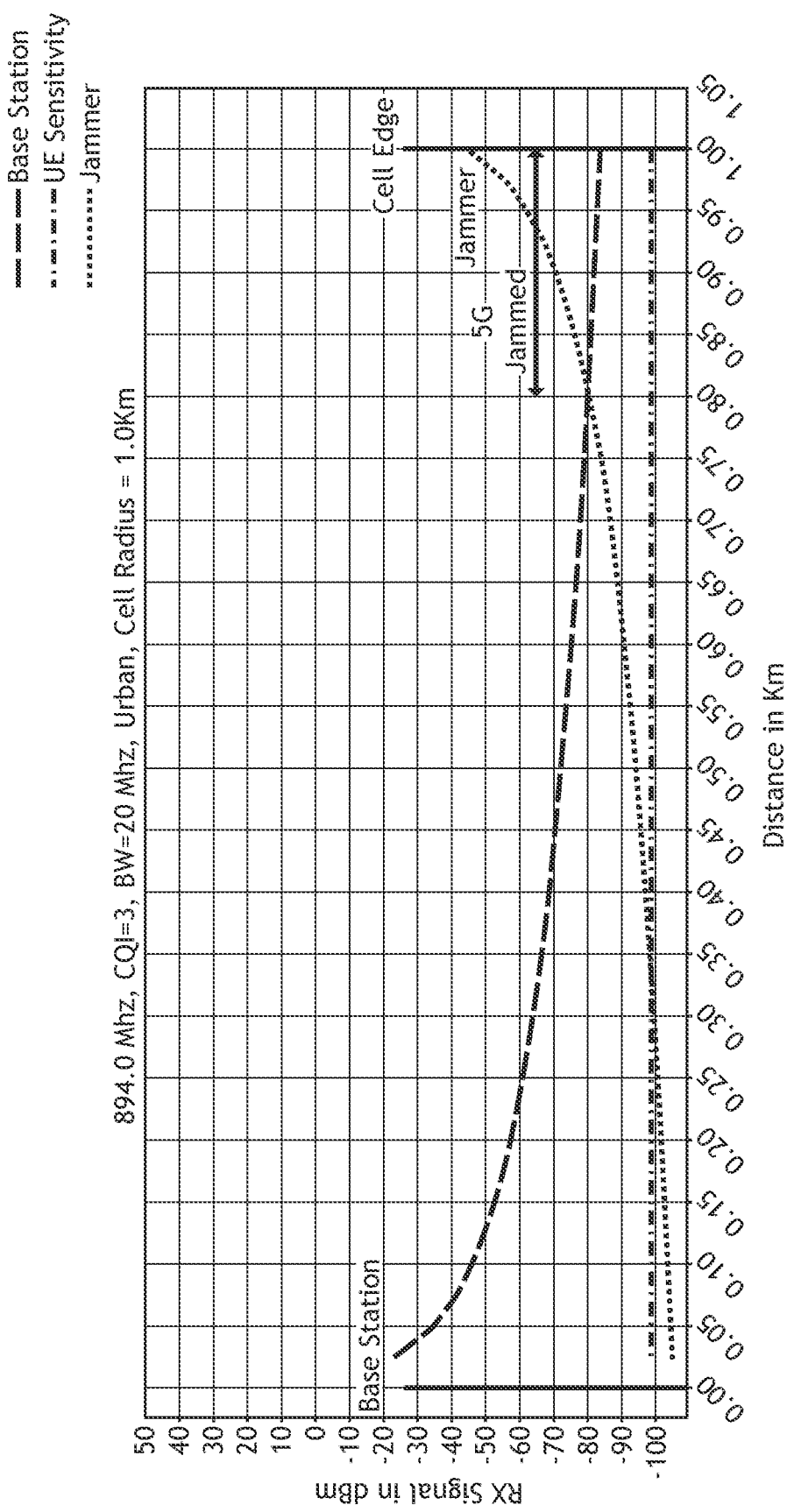
FIG. 5C is a chart showing an effect of jamming in an urban environment, in accordance with one or more embodiments of the present disclosure.

FIG. 5C is a chart showing the effect of jamming in an urban environment, in accordance with one or more embodiments of the present disclosure. Here, the jammer is placed at the cell edge (1 km from the base station 106) in urban terrain, with a signal at CQI-1. FIG. 5C shows that when the CQI is reduced from three to one, the range of the base station 106 can be extended from 0.75 km to 0.80 km. However, this comes at a tradeoff in data rate, as CQI-1 is significantly slower than CQI-3.

Figure 5D:
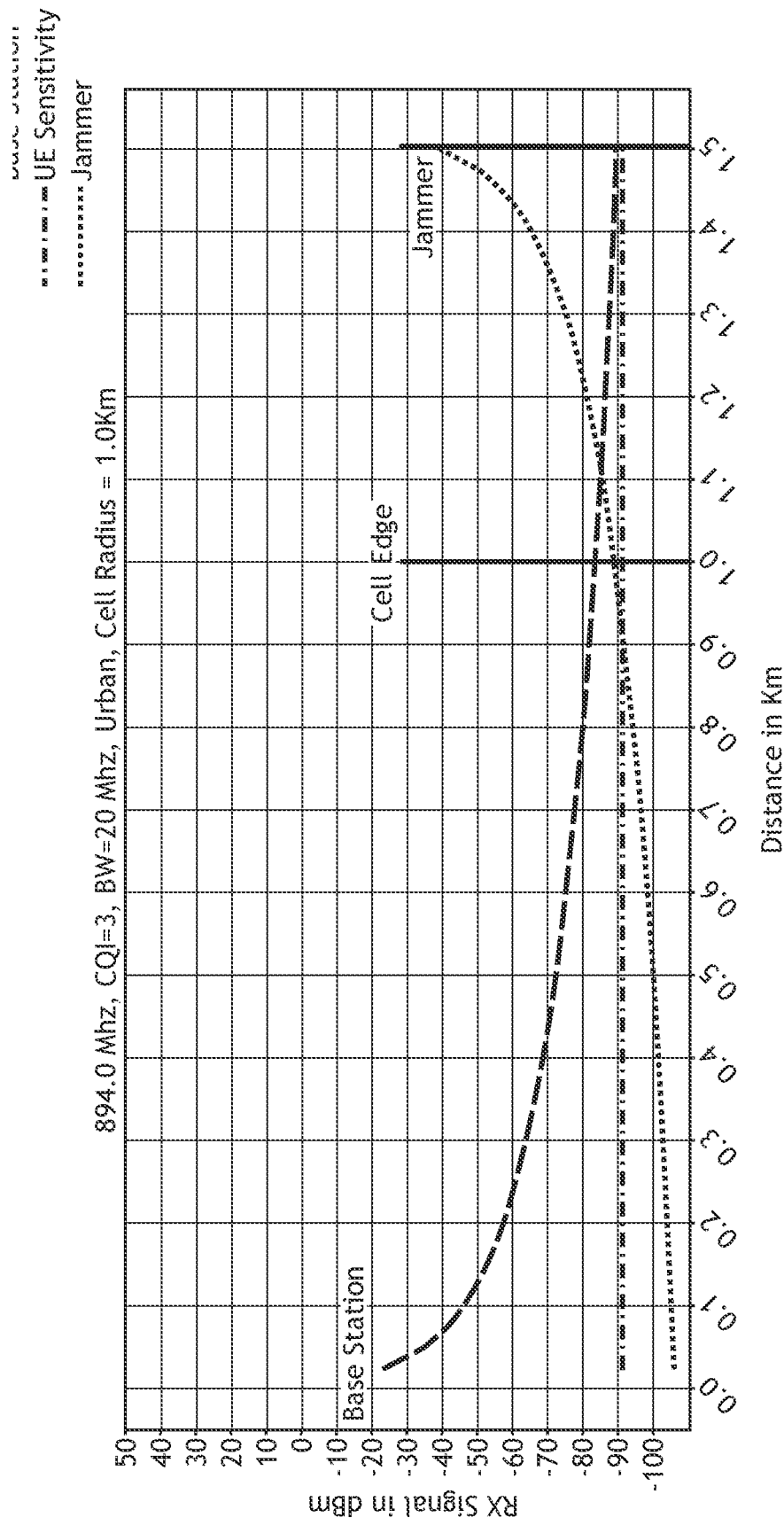
FIG. 5D is a chart showing an effect of jamming when the jammer has been moved beyond a cell edge, in accordance with one or more embodiments of the present disclosure.

FIG. 5D is a chart showing the effect of jamming when the jammer is located beyond the cell edge, in accordance with one or more embodiments of the present disclosure. Here, the jammer is placed 0.5 km past the cell edge (1.5 km from the base station 106) in urban terrain, with a signal at CQI-3. The jammer may be forced to move through any suitable means (e.g., tanks, missiles, or the like). When the jammer is moved to 1.5 km from the base station, the user equipment 108 will experience no jamming, as the jammer is not stronger than the signal from the base station 106 until past the cell edge.

Figure 5E:
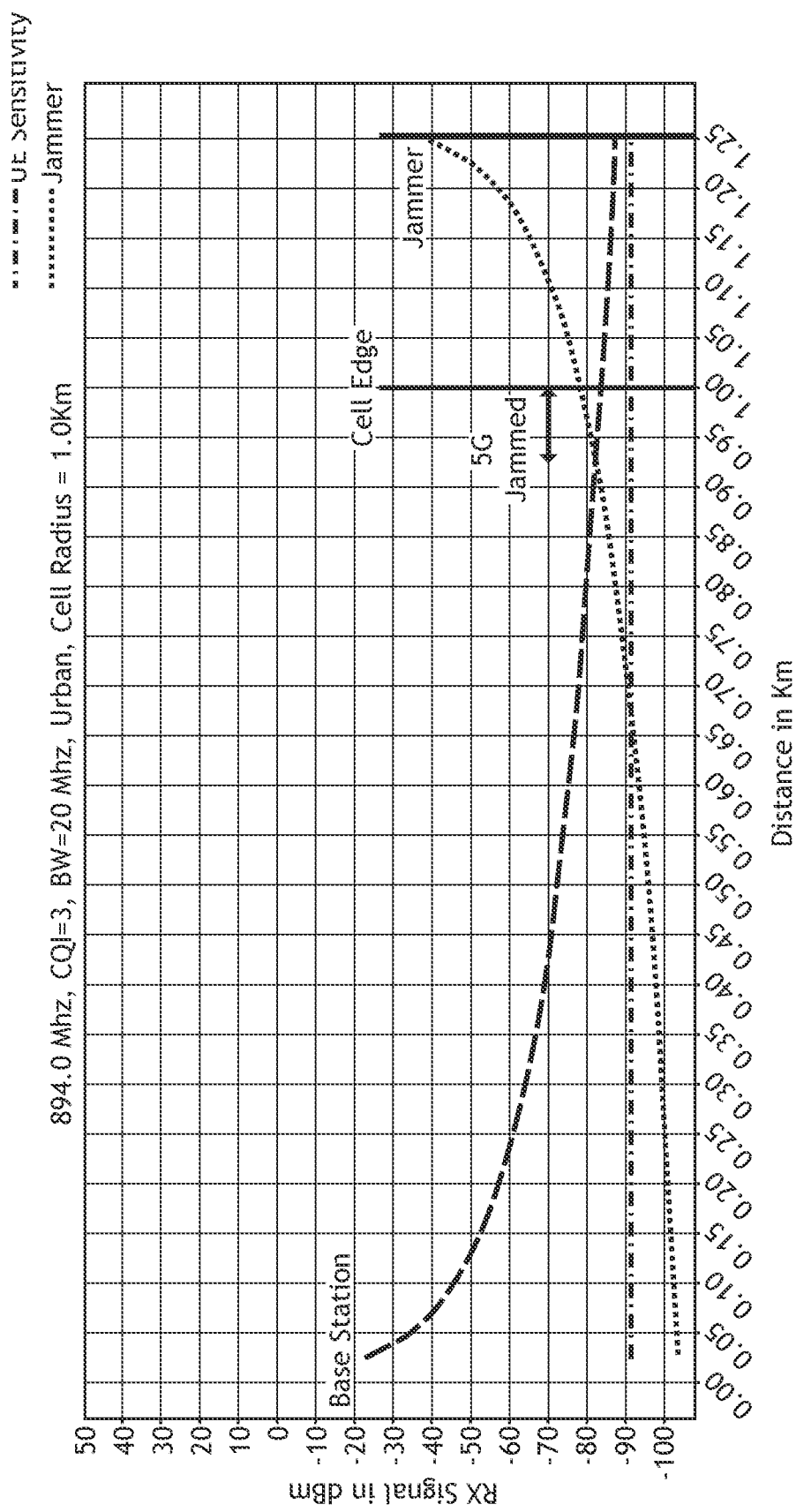
FIG. 5E is a chart showing an effect of jamming when the jammer has been moved beyond a cell edge, in accordance with one or more embodiments of the present disclosure.

FIG. 5E is a chart showing the effect of jamming when the jammer has been moved beyond the cell edge, in accordance with one or more embodiments of the present disclosure. Here, the jammer is placed 0.25 km beyond the cell edge (1.25 km from the base station 106) in urban terrain, with a signal at CQI-3. It can be seen that moving the jammer 1.25 km from the base station will reduce the effect of jamming, but not completely reduce the effects. Moving the jammer 1.25 km from the base station results in a range of the base station of approximately 0.925 km, up from 0.75 km when the base station is located 1 km from the base station 106 (e.g., at the cell edge).

Figure 5F:
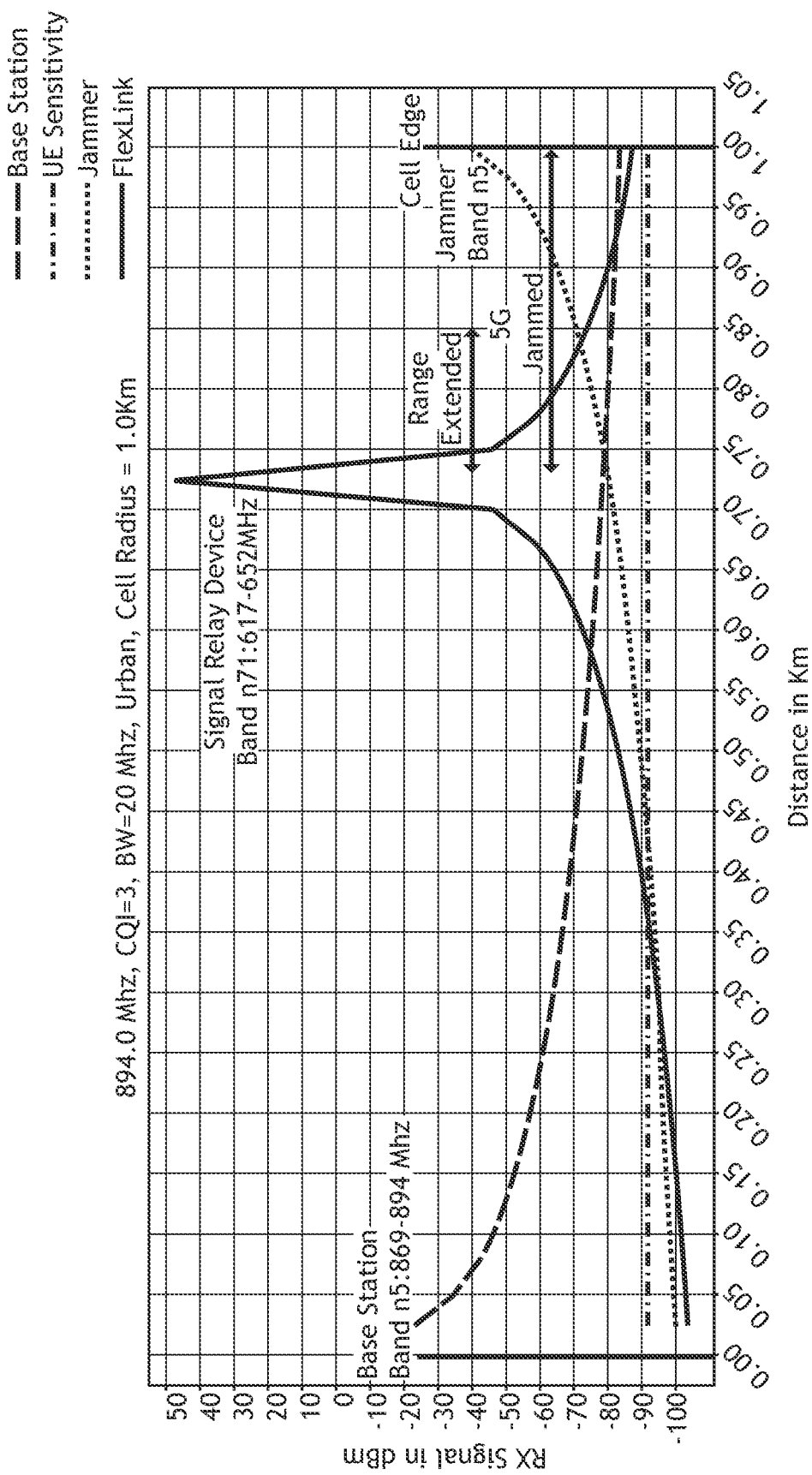
FIG. 5F is a chart showing an effect of jamming when a signal relay device is introduced, in accordance with one or more embodiments of the present disclosure.

FIG. 5F is a chart showing the effect of jamming when a signal relay device 104 is introduced, in accordance with one or more embodiments of the present disclosure. Here, the jammer is placed at the cell edge (1 km from the base station 106) in urban terrain, with a signal at CQI-3. In this way, the signal from the base station 106 is still jammed beyond a distance of 0.75 km from the base station 106. However, a signal relay device 104 is placed slightly closer to the base station 106 than the jammed distance (e.g., at 0.725 km). The signal relay device 104 may receive a signal from the base station 106 before it is jammed and relay it to the user equipment 108 on a channel that is not jammed (here, channel n71). This may effectively extend the distance at which the signal from the base station 106 may be heard by user equipment 108 (e.g., effectively extend the range of the base station 106 from 0.75 km to 0.85 km).

Figure 5G:
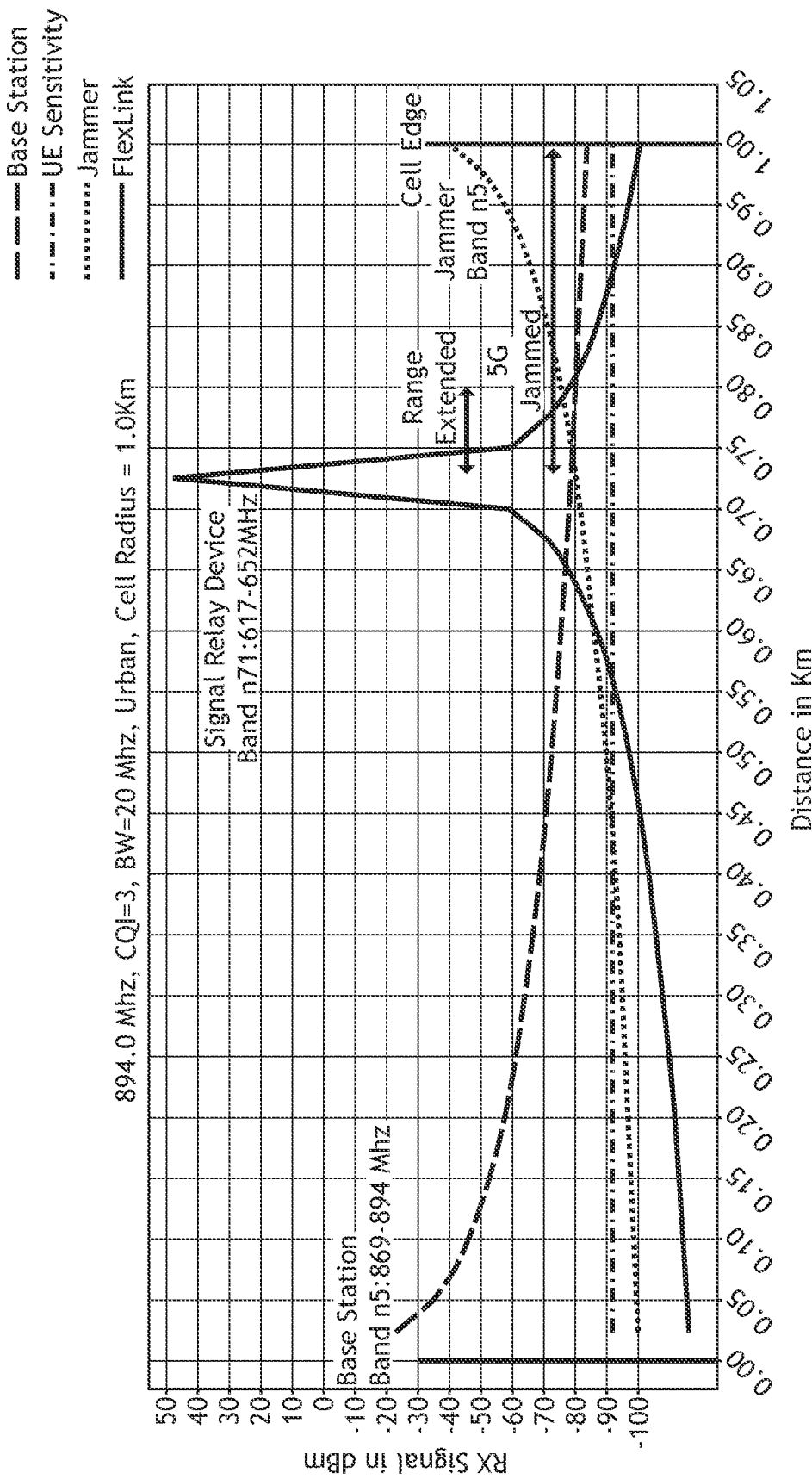
FIG. 5G is a chart showing an effect of jamming when a signal relay device is introduced, in accordance with one or more embodiments of the present disclosure.

FIG. 5G is a chart showing the effect of jamming when a signal relay device 104 is introduced, in accordance with one or more embodiments of the present disclosure. Here, the jammer is placed at the cell edge (1 km from the base station 106) in urban terrain, with a signal at CQI-3. In this way, the signal from the base station 106 is still jammed beyond a distance of 0.75 km from the base station 106. However, a signal relay device 104 is placed slightly closer to the base station 106 than the jammed distance (e.g., at 0.725 km). The signal relay device 104 may receive a signal from the base station 106 before it is jammed and relay it to the user equipment 108 on a channel that is not jammed (here, channel n7). This may effectively extend the distance at which the signal from the base station 106 may be heard by user equipment 108 (e.g., effectively extend the range of the base station 106 from 0.75 km to 0.80 km). However, the change in channel from n71 to n7 reduced the effective range of the base station by 0.05 km.

Figure 5H:
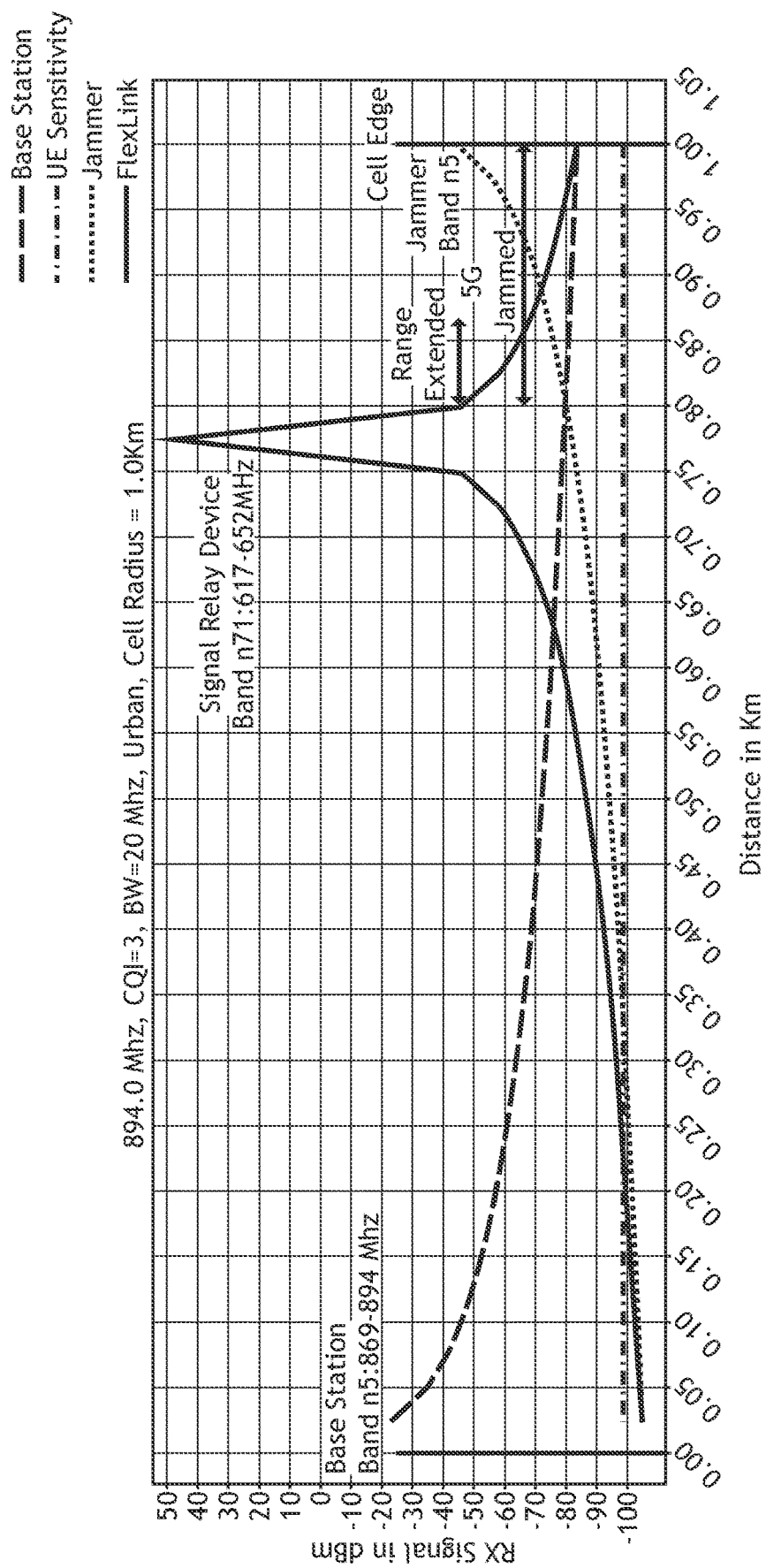
FIG. 5H is a chart showing an effect of jamming when a signal relay device is introduced and the data rate is reduced, in accordance with one or more embodiments of the present disclosure.

FIG. 5H is a chart showing the effect of jamming when a signal relay device 104 is introduced and the data rate is reduced, in accordance with one or more embodiments of the present disclosure. Here, the jammer is placed at the cell edge (1 km from the base station 106) in urban terrain, with a signal at CQI-1. In this way, the signal from the base station 106 is still jammed beyond a distance of 0.80 km from the base station 106 (e.g., as in FIG. 5C). However, a signal relay device 104 is placed slightly closer to the base station 106 than the jammed distance (e.g., at 0.775 km). The signal relay device 104 may receive a signal from the base station 106 before it is jammed and relay it to the user equipment 108 on a channel that is not jammed (here, channel n71). This may effectively extend the distance at which the signal from the base station 106 may be heard by user equipment 108 (e.g., effectively extend the range of the base station 106 from 0.80 km to approximately 0.90 km). However, as was discussed previously with respect to FIG. 5C, the extended range associated with using a signal at CQI-1 comes with the tradeoff of reduced speed.

Figure 5I:
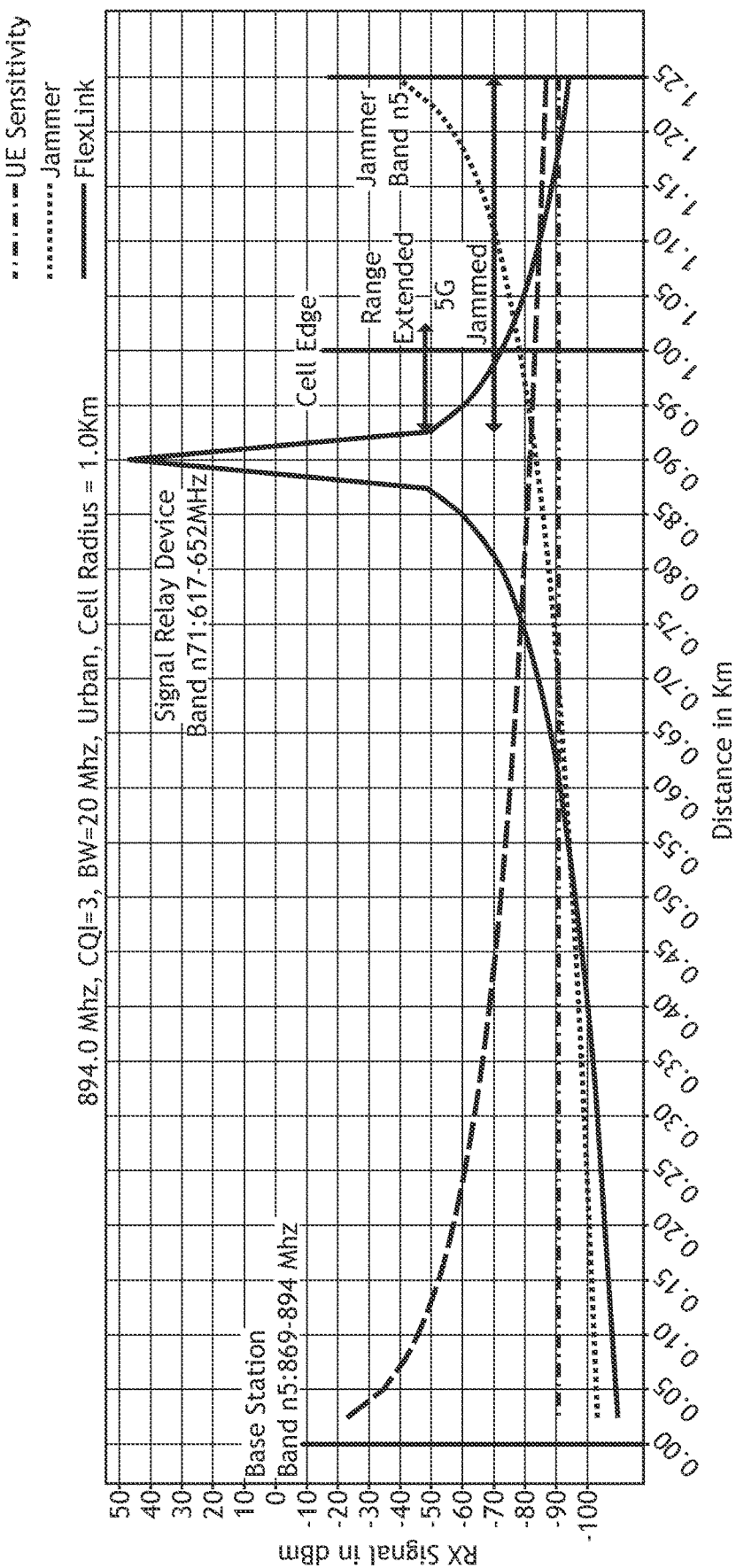
FIG. 5I is a chart showing an effect of jamming when a signal relay device is introduced and the jammer is moved beyond a cell edge, in accordance with one or more embodiments of the present disclosure.

FIG. 5I is a chart showing the effect of jamming when a signal relay device 104 is introduced and the jammer is moved beyond the cell edge, in accordance with one or more embodiments of the present disclosure. Here, the jammer is placed 0.25 km beyond the cell edge (1.25 km from the base station 106) in urban terrain, with a signal at CQI-3. In this way, the signal from the base station 106 is still jammed beyond a distance of 0.925 km from the base station 106 (e.g., as in FIG. 5E). However, a signal relay device 104 is placed slightly closer to the base station 106 than the jammed distance (e.g., at 0.90 km). The signal relay device 104 may receive a signal from the base station 106 before it is jammed and relay it to the user equipment 108 on a channel that is not jammed (here, channel n71). This may effectively extend the distance at which the signal from the base station 106 may be heard by user equipment 108 (e.g., effectively extend the range of the base station 106 from 0.925 km to 1.25 km). Because the effective distance of the base station 106 is beyond the 1 km cell edge, the jammer will not affect the ability of the user equipment 108 to hear the signal from the base station 106.

Figure 6:
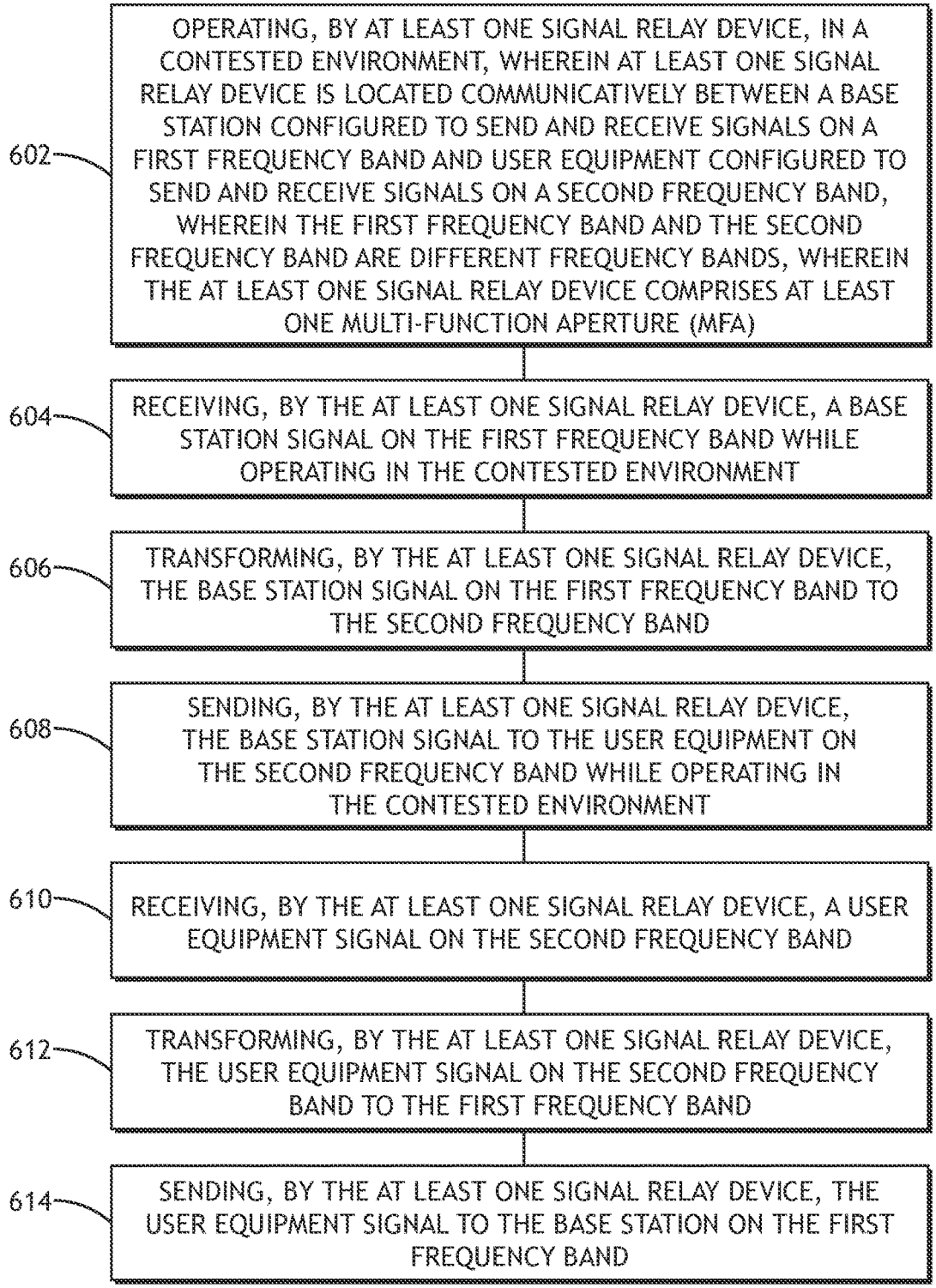
FIG. 6 is a flow diagram depicting a method, in accordance with one or more embodiments of the present disclosure.

FIG. 6 is a flow diagram depicting a method 600 used to extend signal range into a jammed environment, in accordance with one or more embodiments of the present disclosure. Applicant notes that the embodiments and enabling technologies described previously herein in the context of the system 100 should be interpreted to extend to the method 600. It is further noted, however, that the method 600 is not limited to the architecture of the system 100.

In some embodiments, the method 600 includes a step 602 of operating, by at least one signal relay device, in a contested environment, wherein at least one signal relay device is located communicatively between a base station configured to send and receive signals on a first channel and user equipment configured to send and receive signals on a second channel, wherein the first channel and the second channel are different channels, wherein the at least one signal relay device comprises at least one multi-function aperture (MFP) and at least one multi-function processor (MFA). For example, the contested environment may be a jammed environment, wherein a signal from a base station is prevented from reaching user equipment in the jammed area. Therefore, a signal relay device may be used to effectively extend the range of the base station into the jammed area so that the user equipment may hear messages from the base station.

In some embodiments, the method 600 includes a step 604 of receiving, by the at least one signal relay device, a base station signal on the first channel while operating in the contested environment. For example, the base station may send a signal intended for user equipment in a jammed area. However, because the user equipment is in the jammed area, the signal from the base station would be prevented from reaching the user equipment. Therefore, the signal from the base station may first reach the signal relay device.

In some embodiments, the method 600 includes a step 606 of transforming, by the at least one signal relay device, the base station signal on the first channel to the second channel. Because the base station and the user equipment operate on different channels, a transformation of the base station signal may be necessary so that the user equipment may receive the signal.

In some embodiments, the method 600 includes a step 608 of sending, by the at least one signal relay device, the base station signal to the user equipment on the second channel while operating in the contested environment. After the signal relay device has transformed the signal from the base station to a signal on a channel the user equipment may receive, the transformed may be sent from the signal relay device to the user equipment. The signal may be sent from the signal relay device to the user equipment on a channel that is not being jammed.

In some embodiments, the method 600 includes a step 610 of receiving, by the at least one signal relay device, a user equipment signal on the second channel. For example, the user equipment may send a signal intended for the base station, but the user equipment is in a jammed area. However, because the user equipment is in the jammed area, the signal from the user equipment to the base station would be prevented from reaching the base station. Therefore, the signal from the user equipment may first reach the signal relay device.

In some embodiments, the method 600 includes a step 612 of transforming, by the at least one signal relay device, the user equipment signal on the second channel to the first channel. Because the user equipment and the base station operate on different channels, a transformation of the signal from the user equipment may be necessary so that the base station may receive the signal.

In some embodiments, the method 600 includes a step 614 of sending, by the at least one signal relay device, the user equipment signal to the base station on the first channel. After the signal relay device has transformed the signal from the user equipment to a signal on a channel the base station may receive, the transformed signal may be sent from the signal relay device to the user equipment. The signal may be sent from the signal relay device to the user equipment on a channel that is not being jammed. However, because the signal relay device and the base station are both located outside the jammed area, the channel selected to send the signal from the signal relay device to the base station may not need to be on a channel that is not jammed.

Figure 7:
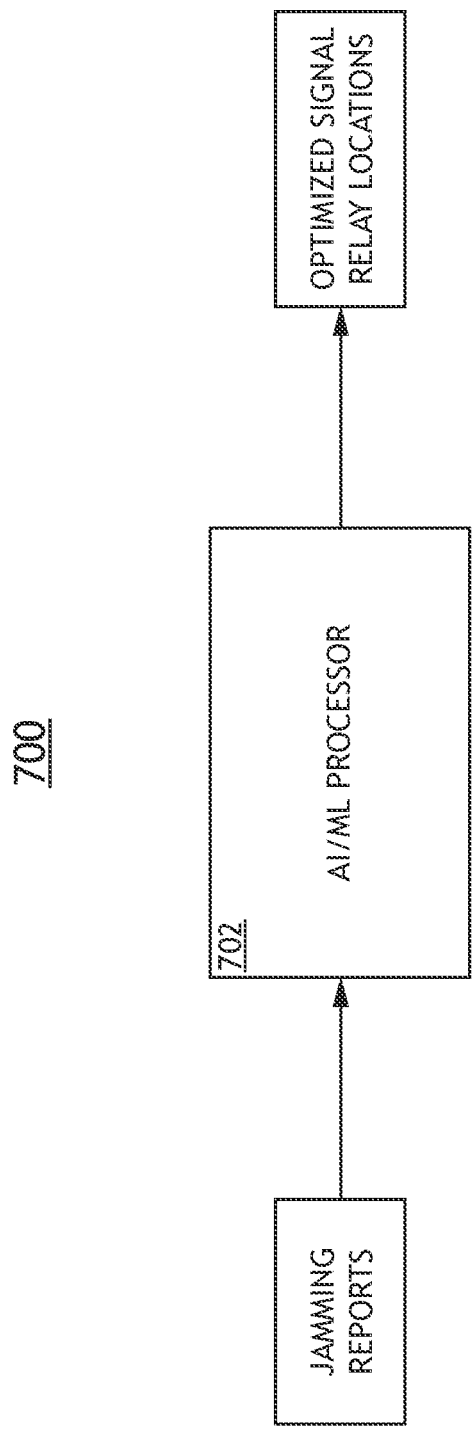
FIG. 7 is a block diagram of an optimization system, in accordance with one or more embodiments of the present disclosure.

FIG. 7 is a block diagram of an optimization system 700, in accordance with one or more embodiments of the present disclosure.

In embodiments, the optimization system includes an artificial intelligence/machine learning (AI/ML) processor 702. The AI/ML processor 702 may receive an input of jamming reports (e.g., reports of jammed areas 102 sent to the mission commander and/or reports of jammed channels from the signal relay device 104). The AI/ML processor 702 may use artificial intelligence or machine learning methods (e.g., any artificial intelligence or machine learning methods known in the art) and process the jamming reports. The processed jamming reports may be used to determine optimum placement of the signal relay devices 104. For example, the signal relay devices 104 may be placed such that the amount of user equipment 108 being jammed is minimized. By way of another example, the signal relay devices 104 may be placed such that the number of signal relay devices 104 required to allow base station 106 communication with all user equipment 108 is minimized.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system, comprising:
at least one signal relay device communicatively located between a base station configured to send and receive signals on a first channel and user equipment configured to send and receive signals on a second channel, wherein the first channel and the second channel are different channels, wherein the at least one signal relay device comprises at least one multi-function aperture (MFA), wherein the at least one signal relay device is configured to:
operate in a contested environment;
receive a base station signal on the first channel while operating in the contested environment;
transform the base station signal on the first channel to the second channel;
send the base station signal to the user equipment on the second channel while operating in the contested environment;
receive a user equipment signal on the second channel;
transform the user equipment signal on the second channel to the first channel; and
send the user equipment signal to the base station on the first channel;
wherein the at least one signal relay device configured to transform the base station signal on the first channel to the second channel and transform the user equipment signal on the second channel to the first channel further comprises:
an auxiliary receiver, wherein a downlink radio frequency signal is directed to the auxiliary receiver to be transformed to an intermediate frequency via at least one frequency mixer stage with local oscillator injections and passband filtering in order to create a replica of the downlink radio frequency signal at the intermediate frequency; and
a loopback configuration to direct the intermediate frequency to a main receiver exciter in order to transform the intermediate frequency into an uplink radio frequency with the at least one frequency mixer stage with the local oscillator injections and the passband filtering.

2. The system of claim 1, wherein the user equipment is a mobile phone configured to communicate with a fifth generation (5G) signal.

3. The system of claim 1, wherein the user equipment is a mobile phone configured to communicate with a sixth generation (6G) signal.

4. The system of claim 1, wherein the second channel is selected to be different than one or more jammed channels.

5. The system of claim 1, wherein the at least one signal relay device is deployed on a vehicle.

6. The system of claim 5 wherein the vehicle is positioned to counteract a signal jammer upon the base station receiving notice that one or more channels are being jammed by the signal jammer.

7. The system of claim 1, wherein the at least one signal relay device is further communicatively located between the base station and a jammed area.

8. The system of claim 1, wherein the first channel and the second channel are selected from an area of overlap between operable channels of the base station and operable channels of the user equipment.

9. The system of claim 1, wherein the at least one MFA is configured to perform radio frequency (RF) functions of a radio.

10. The system of claim 1, wherein at least one multi-function processor (MFP) is configured to perform at least one of waveform signal processing, cryptography, or networking functions.

11. The system of claim 10, wherein the at least one MFP is configured to perform the waveform signal processing, the cryptography, and the networking functions.

12. The system of claim 1, wherein there is at least one of a digital connection or an analog connection between at least one multi-function processor (MFP) and the at least one MFA.

13. The system of claim 1, wherein the at least one MFA digitizes at least one of radio frequency or intermediate frequency signals and provides digitized signals to at least one multi-function processor (MFP).

14. The system of claim 1, wherein the at least one MFA supports a half-duplex channel and a receive only channel, the receive only channel configured to receive signals from all supported channels, wherein the half-duplex channel is a half-duplex main channel and the receive only channel is a receive only auxiliary channel.

15. The system of claim 1, wherein the contested environment is a jammed environment.

16. The system of claim 15, wherein the user equipment detects one or more jammed channels.

17. The system of claim 1, further comprising one or more artificial intelligence/machine learning (AI/ML) processors, wherein the one or more AI/ML processors are configured to:
receive at least one jamming report identifying at least one jammed area;
process the at least one jamming reports; and
locate the at least one signal relay device, using the at least one processed jamming reports to at least one of:
locate the at least one signal relay device such that an amount of the user equipment being jammed is minimized; or
locate the at least one signal relay device such that a number of the signal relay devices required to allow the base station to communicate with the user equipment is minimized.

18. The system of claim 1, wherein the signal relay device is further configured to:
perform a scan of a radio frequency (RF) spectrum in order to determine which of the channels are jammed; and
pick a signal that is not jammed after performing the scan in order to relay the base station signal to the user equipment.

19. A method, comprising:

operating, by at least one signal relay device, in a contested environment, wherein the at least one signal relay device is located communicatively between a base station configured to send and receive signals on a first channel and user equipment configured to send and receive signals on a second channel, wherein the first channel and the second channel are different channels, wherein the at least one signal relay device comprises at least one multi-function aperture (MFA);

receiving, by the at least one signal relay device, a base station signal on the first channel while operating in the contested environment;

transforming, by the at least one signal relay device, the base station signal on the first channel to the second channel;

sending, by the at least one signal relay device, the base station signal to the user equipment on the second channel while operating in the contested environment;

receiving, by the at least one signal relay device, a user equipment signal on the second channel;

transforming, by the at least one signal relay device, the user equipment signal on the second channel to the first channel; and sending, by the at least one signal relay device, the user equipment signal to the base station on the first channel;

wherein the at least one signal relay device configured to transform the base station signal on the first channel to the second channel and transform the user equipment signal on the second channel to the first channel further comprises:

an auxiliary receiver, wherein a downlink radio frequency signal is directed to the auxiliary receiver to be transformed to an intermediate frequency via at least one frequency mixer stage with local oscillator injections and passband filtering in order to create a replica of the downlink radio frequency signal at the intermediate frequency; and a loopback configuration to direct the intermediate frequency to a main receiver exciter in order to transform the intermediate frequency into an uplink radio frequency with the at least one frequency mixer stage with the local oscillator injections and the passband filtering.

\* \* \* \* \*